(12) United States Patent
Chen

(10) Patent No.: US 6,501,502 B1
(45) Date of Patent: Dec. 31, 2002

(54) AUTOMATIC DETECTOR FOR STARTING SECURITY CAMERAS

(76) Inventor: Kuo-Cheng Chen, 8F-1, No. 196, Sec. 2, Chung Ching N. Rd., Taipei (TW)

( * ) Notice: Subject to any disclaimer, the term of this patent is extended or adjusted under 35 U.S.C. 154(b) by 362 days.

(21) Appl. No.: 09/606,026

(22) Filed: Jun. 29, 2000

(51) Int. Cl.[7] .................................................. H04N 7/18
(52) U.S. Cl. ...................... 348/152; 348/155; 348/375; 360/5; 386/46
(58) Field of Search ................................. 348/152, 155, 348/375; 360/5; 386/46; H04N 7/18

(56) References Cited

U.S. PATENT DOCUMENTS

| | | | | |
|---|---|---|---|---|
| 3,924,130 A | * | 12/1975 | Cohen | 348/152 |
| 5,327,233 A | * | 7/1994 | Choi | 348/152 |
| 5,473,368 A | * | 12/1995 | Hart | 348/155 |
| 5,825,413 A | * | 10/1998 | Mullis | 348/155 |
| 6,292,222 B1 | * | 9/2001 | Bernhardt | 348/375 |
| 6,429,893 B1 | * | 8/2002 | Xin | 348/155 |

* cited by examiner

Primary Examiner—Howard Britton
(74) Attorney, Agent, or Firm—Jacobson Holman PLLC

(57) ABSTRACT

An automatic detector for starting security cameras comprises a detection module disposed on a video camera and the detection module includes a regulator circuit, a light-sensitive circuit, a switch circuit, and a passive infrared sensor circuit, and a recorder control circuit. The passive infrared sensor circuit is connected to the main body of security cameras, the switch circuit is connected to a light and the recorder control circuit is connected to a video camera recorder. In accordance with the structure mentioned above, the main body of the security cameras and the video camera recorder is started by the passive infrared sensor circuit to detect the infrared energy emitted from human bodies. If the illumination of the environment is insufficient, the light-sensitive circuit makes the switch circuit work to switch the light on so that the light is enough to make the pictures clearly.

4 Claims, 3 Drawing Sheets

AUTOMATIC DETECTOR FOR STARTING SECURITY CAMERAS

BACKGROUND OF THE INVENTION

1. Field of the Invention

The present invention relates to an automatic detector for starting security cameras, especially to those detecting light in the area and infrared energy emitted from human bodies to switch the security cameras on or off.

2. Description of the Prior Art

Security cameras are disposed on certain areas of factories such as the main gate, doorway, corridors, passages, and stairways for the sake of surveillance. These CCD cameras monitor for 24 hours day after day and the related video camera recorders are also recording continuously. The most common specifications of video tapes includes 60 minutes, 90 minutes and 120 minutes. Thus the video tapes for storage of 24-hour recording pictures are in large amount. Even the tapes can be reused after a period of time, the space for keeping these tapes in storage is quite large.

While nobody passed by, security cameras and video camera recorders are still monitoring and recording so the useless pictures occupy most of the pictures and increase the number of tapes stored.

Furthermore, the low light of the environment will affect the quality of pictures while recording so there is difficulty on the identification of the person inside the picture. Illuminator can be used but then the expense of electricity increases and the energy is wasted while no one passes the area.

SUMMARY OF THE INVENTION

It is therefore the primary object of the present invention to provide an automatic detector for starting security cameras that automatically switch on security cameras by detecting infrared energy emitted from human bodies in order to decrease the number of video tapes with no-man's pictures therein.

A further object of the present invention is to provide an automatic detector for starting security cameras that automatically switch on illumination devices by detecting the light of the area in order to avoid the waste of energy.

The device comprises a detection module disposed on a video camera. The detection module therein includes a regulator circuit, a light-sensitive circuit, a switch circuit, and a passive infrared sensor circuit, and a recorder control circuit, wherein the passive infrared sensor circuit is connected to the main body of security cameras, the switch circuit is connected to a light and the recorder control circuit is connected to a video camera recorder. In. accordance with the structure mentioned above, the main body of the security cameras and the video camera recorder is started by the passive infrared sensor circuit to detect the infrared energy emitted from human bodies. Therefore, the amount of no-man's-picture is decreased and the number of video tapes is also reduced. If the light of the environment is insufficient, the switch circuit is activated by the light-sensitive circuit to switch the light on so that the light is enough to make the pictures clearly.

BRIEF DESCRIPTION OF THE DRAWINGS

The invention will be best understood by reference to the following description taken in connection with the accompanying drawings.

DETAILED DESCRIPTION OF THE PREFERRED EMBODIMENT

Figure 1:
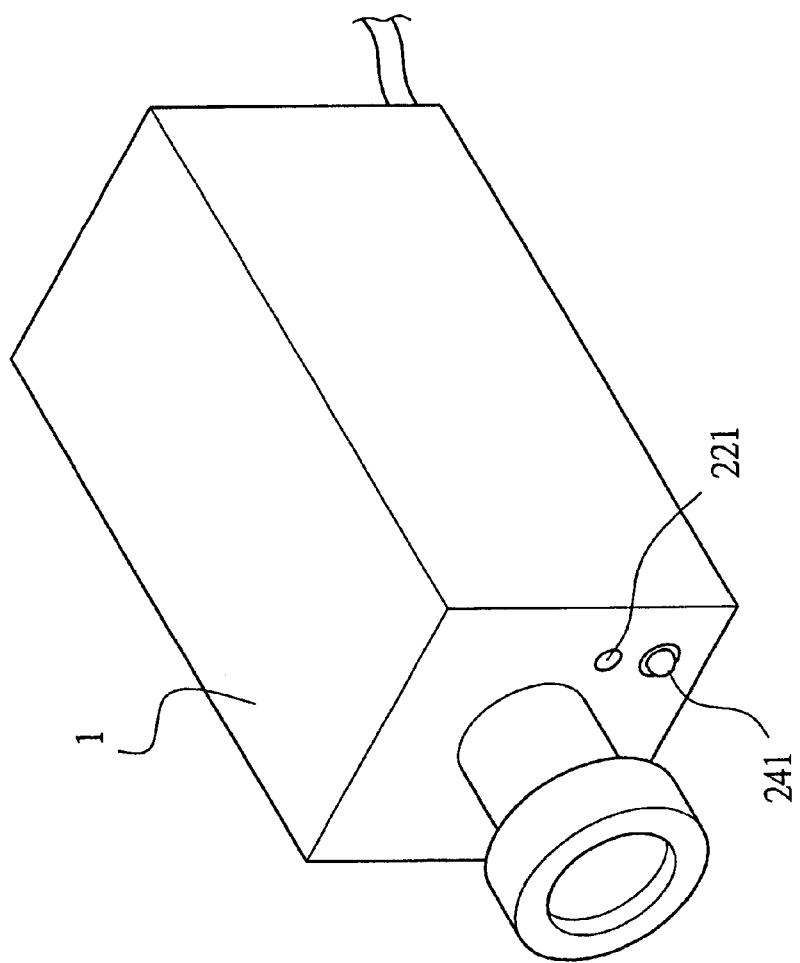
FIG. 1 shows a perspective view of the present invention.
Figure 2:
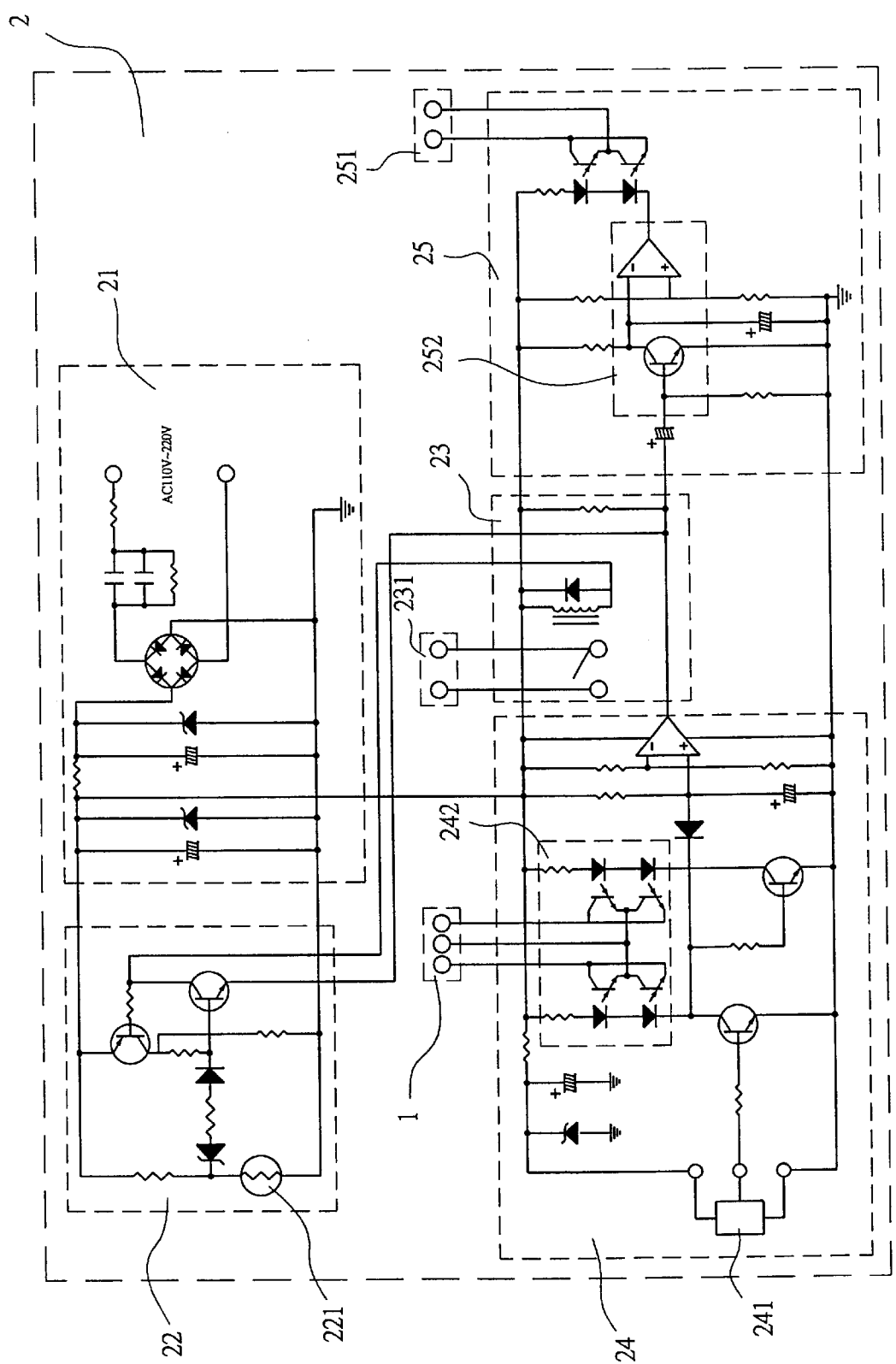
FIG. 2 shows a circuit diagram of the present invention.

With reference to the FIG. 1 & FIG. 2, the device comprises a detection module 2 disposed on a main body of a security camera 1 while the detection module 2 includes a regulator circuit 21, a light-sensitive circuit 22, a switch circuit 23, and a passive infrared sensor circuit 24, and a recorder control circuit 25. The regulator circuit 21 is connected to the power supply for providing the internal circuit power. The light-sensitive circuit 22 with a light-sensitive resistance 221 detecting the light in the area therein can control the switch circuit 23. The switch circuit 23 for controlling a light 231 is connected to the light-sensitive circuit 22. The passive infrared sensor circuit 24 including a passive infrared sensor 241 and a photoelectric switch circuit 242 is connected to the regulator circuit 21 and the switch circuit 23. The photoelectric switch circuit 242 is mounted on the main body of the security camera 1 and the passive infrared sensor 241 is mounted in the front end of the main body of the security camera 1. By detecting the infrared energy emitted from human bodies through the passive infrared sensor 241, the main body of the security camera 1 is started for shooting. When the above-mentioned switch circuit 23 is turned on or off, the light 231 is automatically open or shutdown. The recorder control circuit 25 is connected to the passive infrared sensor circuit 24 and a video camera recorder 251. When turning the main body of the security camera 1 on to shoot, the passive infrared sensor circuit 24 simultaneously sends out a signal to activate the recorder control circuit 25 to make the video camera recorder 251 record.

In accordance with the structure mentioned above, the passive infrared sensor 241 of the passive infrared sensor circuit 24 is used to detect the infrared energy emitted from human bodies. When people pass the area, the passive infrared sensor circuit 24 makes the main body of the security camera 1 to shoot by turning the photoelectric switch circuit 242 on and the video camera recorder 251 to record synchronously through the action of the recorder control circuit 25. Therefore, the no-man's-pictures won't be recorded and the number of video tape for storage of pictures is decreased so that the space need for storage video tapes is reduced.

Furthermore, the light-sensitive resistance 221 inside the light-sensitive circuit 22 detects the light of the area. Once the illumination is enough for shooting clearly, the light-sensitive circuit 22 switches down the power supply of the switch circuit 23 to interrupt the electric circuit thus the light 231 connected to the switch circuit 23 is turned off. On the other hand, if the light is low, the light-sensitive circuit 22 turns the switch circuit 23 on. If people pass enter the area, by detecting the infrared energy emitted from human bodies through the passive infrared sensor 241, the passive infrared sensor circuit 24 turns on the switch circuit 23 and thus the light 231 is automatically on. Even the illumination is insufficient, the light will be improves while recording the pictures of security cameras so that the pictures won't be unclear. The light 231 is automatically shutdown while no one pass the area in order to save the energy.

In addition, the detecting surface of the passive infrared sensor 241 is a hemisphere with the diameter from 9 to 18 mm. With such small volume, it can be mounted on the main body of the security camera 1, as shown in FIG. 1.

The recorder control circuit 25 includes a delay circuit therein so that the video camera recorder 251 can be turned on immediately while turned off later for seconds.

Figure 3:
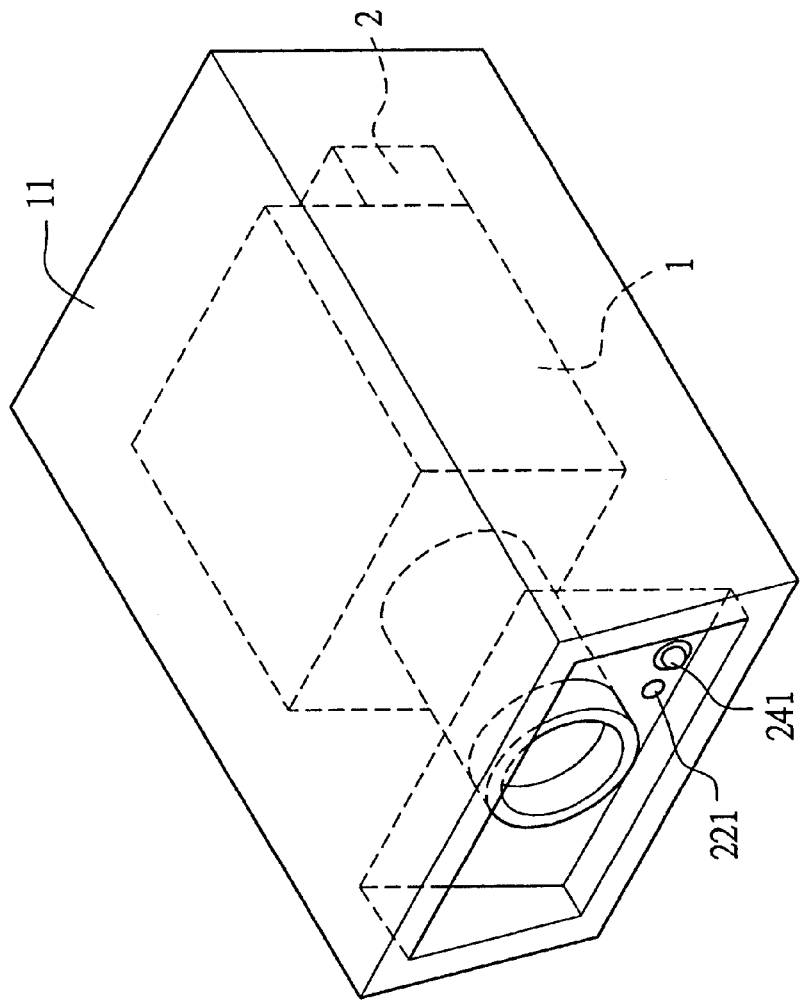
FIG. 3 is another embodiment of the present invention.

Referring to FIG.3, the main body of the security camera 1 is mounted into a shell 11 and the detection module is separated into an independent device that also disposed inside the shell 11. The light-sensitive resistance 221 and the passive infrared sensor 241 are disposed in the front end of the shell 11. This is another embodiment of the present invention.

What is claimed is:

1. An automatic detector for starting security cameras comprising a detection module mounted on the main body of security cameras while said detection module includes a regulator circuit, a light-sensitive circuit, a switch circuit, and a passive infrared sensor circuit, and a recorder control circuit; wherein the improvement is characterized by:

said regulator circuit used for providing power for internal circuit and connected to a power source;

said light-sensitive circuit connected to said regulator circuit and having a light-sensitive resistance therein by which to detect light in the environment in order to control said switch circuit;

said switch circuit used for controlling a light and connected to said light-sensitive circuit;

said passive infrared sensor circuit connected to said regulator circuit and said switch circuit and having a passive infrared sensor as well as a photoelectric switch circuit thereof; said photoelectric switch circuit is disposed on said main body of security cameras and said passive infrared sensor is mounted near the front end of said main body of security cameras for detecting the infrared energy emitted from human bodies to switch on said main body of security cameras; said passive infrared sensor circuit controls said switch circuit on or off to automatically switch said light connected therewith on or off.

said recorder control circuit jointed with said passive infrared sensor circuit is connected to a video camera recorder; while turning on said main body of security cameras for shooting, said passive infrared sensor circuit also sends out a signal simultaneously to activate said recorder control circuit to make said video camera recorder record.

2. The automatic detector for starting security cameras as claimed in claim 1, wherein the detecting surface of said passive infrared sensor is a hemisphere with the diameter from 9 to 18 mm.

3. The automatic detector for starting security cameras as claimed in claim 1, wherein said recorder control circuit having a delay circuit so that said video camera recorder can be turned on immediately and off later for seconds.

4. The automatic detector for starting security cameras as claimed in claim 1, wherein said main body of security camera is mounted in a shell and said detection module is an independent item also mounted in said shell; said light-sensitive resistance and said passive infrared sensor of said detection module are disposed in the front end of said shell.

* * * * *